US011418071B2

(12) United States Patent
Tabuchi et al.

(10) Patent No.: US 11,418,071 B2
(45) Date of Patent: Aug. 16, 2022

(54) ROTATING ELECTRICAL MACHINE WITH CHANNEL IN STATOR SLOT WALLS

(71) Applicant: TOYOTA JIDOSHA KABUSHIKI KAISHA, Toyota (JP)

(72) Inventors: Kenta Tabuchi, Nisshin (JP); Takashi Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/948,974

(22) Filed: Oct. 8, 2020

(65) Prior Publication Data
US 2021/0242729 A1 Aug. 5, 2021

(30) Foreign Application Priority Data
Feb. 5, 2020 (JP) .............................. JP2020-017802

(51) Int. Cl.
*H02K 1/20* (2006.01)
*H02K 1/16* (2006.01)
(52) U.S. Cl.
CPC .................................... *H02K 1/165* (2013.01)
(58) Field of Classification Search
CPC ............ H02K 1/165; H02K 1/20; H02K 1/32; H02K 3/345; H02K 9/19; H02K 9/193; H02K 9/197; H02K 9/20
USPC .................................. 310/179, 52, 54, 58, 59
See application file for complete search history.

(56) References Cited

U.S. PATENT DOCUMENTS

| 3,684,906 A | * | 8/1972 | Lenz | H02K 17/16 |
| | | | | 310/64 |
| 2007/0194638 A1 | * | 8/2007 | Birdi | H02K 1/32 |
| | | | | 310/216.016 |
| 2013/0264897 A1 | * | 10/2013 | Bradfield | H02K 9/19 |
| | | | | 310/58 |
| 2015/0008770 A1 | * | 1/2015 | Fubuki | H02K 9/19 |
| | | | | 310/54 |

FOREIGN PATENT DOCUMENTS

| FR | 3091059 A1 | * | 6/2020 | ............ H02K 15/10 |
| JP | 2016-010166 A | | 1/2016 | |
| JP | 2016-054608 A | | 4/2016 | |

OTHER PUBLICATIONS

Machine translation of FR-3091059-A1. (Year: 2020).*

* cited by examiner

*Primary Examiner* — Michael Andrews
(74) *Attorney, Agent, or Firm* — Oblon, McClelland, Maier & Neustadt, L.L.P.

(57) ABSTRACT

A rotating electrical machine includes a rotor, a stator core, coils, and insulating sheets. A discharge port that discharges coolant is provided on an outer circumferential face of the rotor. The stator core includes an annular or cylindrical yoke, and teeth disposed on an inner circumferential face of the yoke in a circumferential direction with spaces. The stator core is disposed encompassing an outer circumference of the rotor. A slot-wall-face channel is provided on a wall face of the stator core defining a slot, and configured to open as to the slot for the coolant to flow through. The coils are wound on the teeth. The insulating sheet is disposed in the slot and interposed between the stator core and the coil, and is configured with at least part of the slot-wall-face channel open as to the coil.

10 Claims, 10 Drawing Sheets

ROTATING ELECTRICAL MACHINE WITH CHANNEL IN STATOR SLOT WALLS

CROSS-REFERENCE TO RELATED APPLICATION

This application claims priority to Japanese Patent Application No. 2020-017802 filed on Feb. 5, 2020, incorporated herein by reference in its entirety.

BACKGROUND

1. Technical Field

The disclosure relates to a rotating electrical machine, and more particularly to a rotating electrical machine provided with an insulating sheet that insulates a coil and stator core.

2. Description of Related Art

There are known electric motors that convert electrical energy into rotational motion energy, generators that convert rotational motion energy into electrical energy, and electrical machines that function both as electric motors and generators. Hereinafter, these electrical machines will be comprehensively referred to as "rotating electrical machines". A typical rotating electrical machine has a rotor and a stator disposed on the outer side of the rotor, encompassing the rotor, with the stator being fixed and the rotor being rotatable. The rotor and the stator respectively have a rotor core and a stator core that constitute magnetic paths.

There is known a rotating electrical machine where a fluid for cooling flows within the rotor core to cool the rotor core from inside. Japanese Unexamined Patent Application Publication No. 2016-010166 (JP 2016-010166 A) describes a rotor (20) where coolant oil is fed from an inner space (17) of a hollow rotor shaft (16) to a coolant oil channel (51) extending in the radial direction within a rotor core (21), cooling the rotor core (21) from the inside. The coolant oil channel (51) has an opening that opens on an outer circumferential face of the rotor core (21), and the coolant oil that passes through the coolant oil channel (51) is discharged from the opening toward a stator (10).

A stator typically has teeth disposed in the circumferential direction with spaces therebetween, and coils provided by winding wire on the teeth. In some arrangements, insulating sheets for insulating are disposed between the teeth and the coils. Note that the signs in parentheses above are signs used in JP 2016-010166 A, and are unrelated to signs used in the description of embodiments of the present application.

SUMMARY

Part of a coil is situated in a slot, which is a space between adjacent teeth, and cooling may not be able to be sufficiently performed due to an exposed portion being small. When providing a coolant channel in the stator core and bringing the coolant into contact with the coil in the slot to improve cooling performance in an arrangement where an insulating sheet is provided, contact between the coolant and the coil may be impeded by the insulating sheet.

The disclosure provides a rotating electrical machine provided with an insulating sheet, where contact between a coil in a slot and a coolant can be secured.

An aspect of the disclosure provides a rotating electrical machine including a rotor, a stator core, coils, and an insulating sheet. A discharge port that discharges coolant is provided on an outer circumferential face of the rotor. The stator core includes an annular or cylindrical yoke, and teeth arranged on an inner circumferential face of the yoke in a circumferential direction with spaces. The stator core is disposed encompassing an outer circumference of the rotor. A slot-wall-face channel is provided on a wall face of the stator core defining a slot disposed between the teeth that are adjacent in the circumferential direction. The slot-wall-face channel is configured to open as to the slot for the coolant to flow through. The coils are wound on the teeth. The insulating sheet is disposed in the slot and interposed between the stator core and the coil. The insulating sheet is configured with at least part of the slot-wall-face channel open as to the coil.

According to the rotating electrical machine of the aspect of the disclosure, coolant discharged from the rotor flows through the slot-wall-face channel, comes into contact with the coil in the slot at a portion where the slot-wall-face channel is not covered by the insulating sheet and is open, and thus can cool the coil.

In the rotating electrical machine according to the aspect of the disclosure, each of the teeth may include a first main portion, second main portion and a small portion. The small portion may be interposed between the first main portion and the second main portion in an axial direction, a width of the small portion being smaller than widths of the first main portion and the second main portion, and a length of the small portion in a radial direction of the stator core being shorter than lengths of the first main portion and the second main portion in the radial direction of the stator core. According to the rotating electrical machine of this configuration, tooth surface grooves are formed following the surfaces of the teeth, consisting side-face channels extending in the radial direction and being open to the slots, whereby coolant can be made to flow toward the outer side in the radial direction.

In the rotating electrical machine according to the aspect, the insulating sheet may be disposed over the entire length in an axial direction of the slot in which the insulating sheet is disposed. According to the rotating electrical machine of this configuration, fixing one place of the insulating sheet fixes the entire insulating sheet, and accordingly positional displacement within the slot can be suppressed without providing a plurality of insulating sheet fixing portions.

In the rotating electrical machine according to the configuration, the slot-wall-face channel may include a side-face channel that is provided on a side face of at least one of the teeth defining the slot and extends in a radial direction. A notch or an opening may be provided to at least a part of the insulating sheet at a portion facing the side-face channel. According to the rotating electrical machine of this configuration, the coils disposed in the slots can be brought into contact with the coolant through the openings formed facing the side-face channels.

In the rotating electrical machine according to the configuration, the slot-wall-face channel may include a side-face channel and a bottom-face channel. The side-face channel may be provided on a side face of at least one of the teeth defining the slot and extend in the radial direction. The bottom-face channel may be provided on the inner circumferential face of the yoke defining the slot and connect to the side-face channel. An opening may be provided to at least a part of the insulating sheets at a portion facing the bottom-face channel. According to the rotating electrical machine of this configuration, the coils disposed on the bottom of the slots can be brought into contact with the coolant through the openings provided facing the bottom-face channel.

Further, in the rotating electrical machine according to the aspect, the insulating sheet may have a cover portion disposed at a portion where the slot is open as to the rotor so as to cover the coil in the slot. A notch or an opening may be provided to a part of the cover portion. According to the rotating electrical machine of this configuration, even when the coil within the slot is covered by providing the cover portion, the coil disposed in the slot can be brought into contact with the coolant through the opening provided in the cover portion.

In the rotating electrical machine according to the aspect, the discharge port and the slot-wall-face channel may be disposed at a same position in an axial direction of the rotating electrical machine.

Also, the insulating sheet may be divided with a gap at a position of the slot-wall-face channel. According to the rotating electrical machine of this configuration, the coil disposed in the slot can be brought into contact with the coolant through the gap at the divided portion.

Providing portions in the slot-wall-face channel that are not covered by the insulating sheet and are open as to the slot enables coolant to come into contact with coil in the slot.

According to the rotating electrical machine of the disclosure, providing insulating sheets of structures where coolant can come into contact with coils in the slots enables the coils to be cooled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
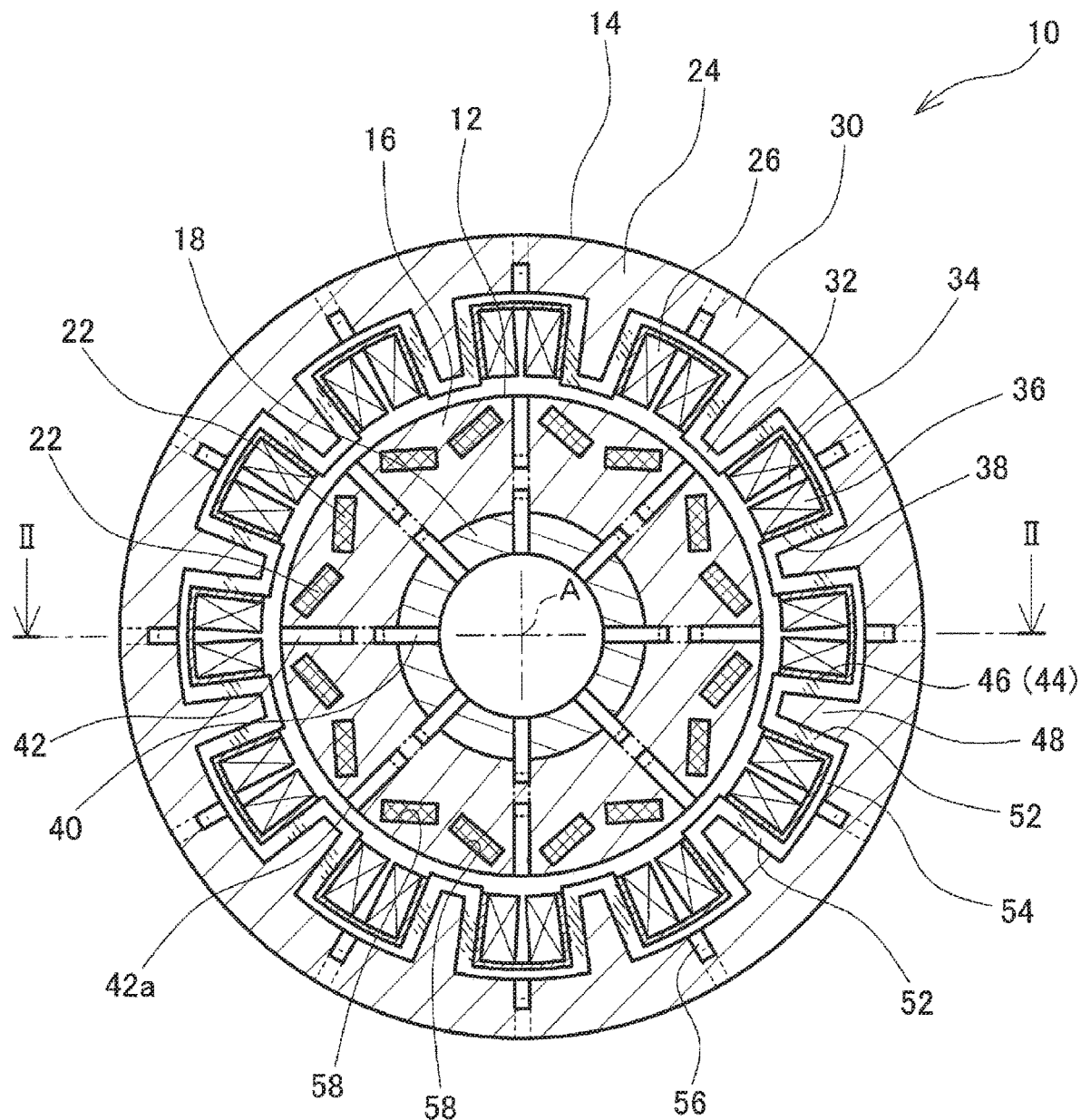
FIG. 1 is a diagram schematically illustrating a cross-section orthogonal to a rotation axis of a rotating electrical machine according to an embodiment of the disclosure.
Figure 2:
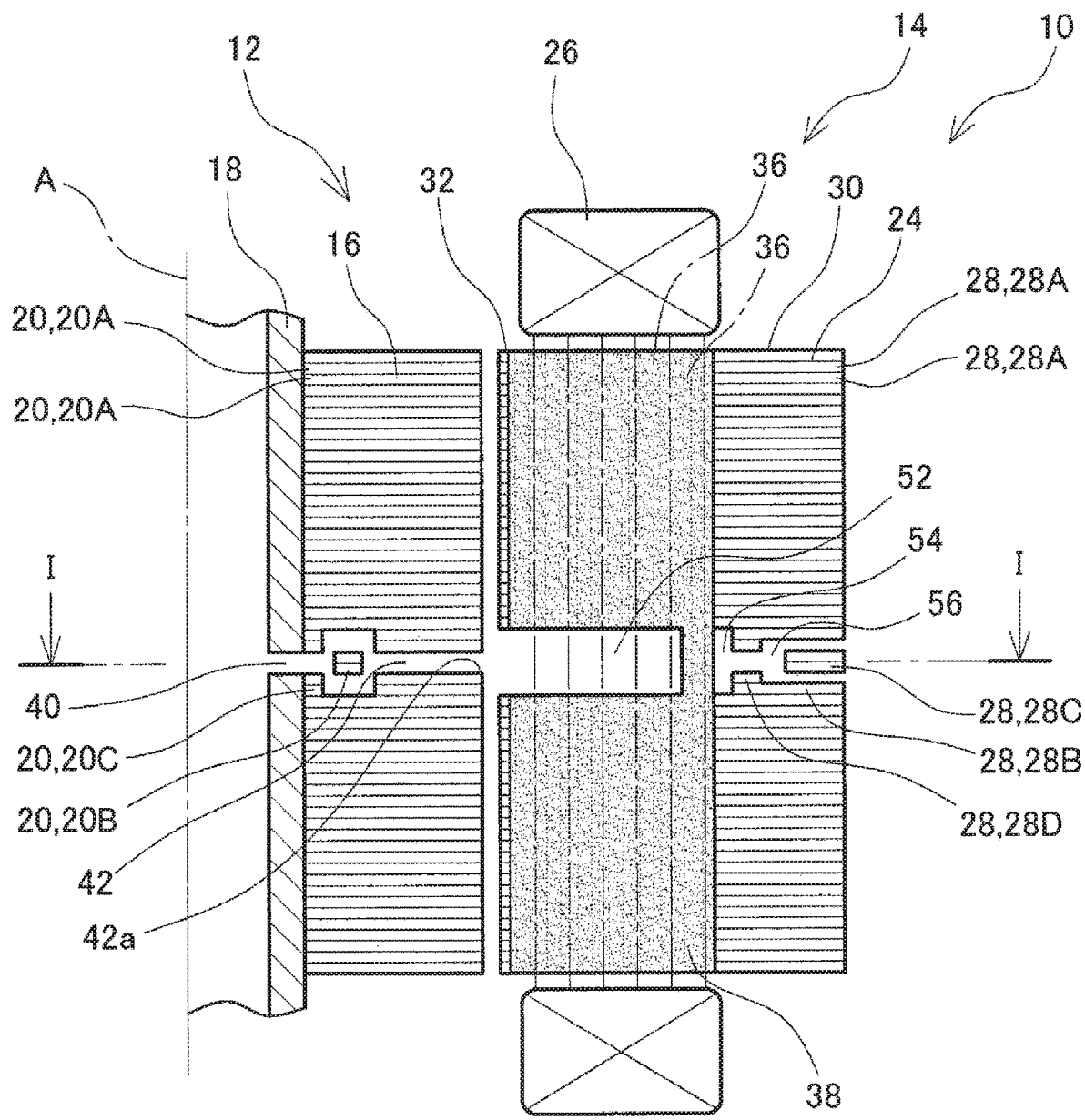
FIG. 2 is a diagram schematically illustrating a II-II cross-section including the rotation axis of the rotating electrical machine illustrated in FIG. 1.

Embodiments of the disclosure will be described below with reference to the drawings. FIGS. 1 and 2 are diagrams schematically illustrating cross-sections of a rotating electrical machine 10 according to the present embodiment. FIG. 1 is a diagram illustrating a cross-section orthogonal to an axis of the rotating electrical machine 10, and in particular illustrating a cross-section taken along line I-I in FIG. 2. FIG. 2 is a diagram illustrating a cross-section including the axis, and in particular illustrating a cross-section taken along line II-II in FIG. 1.

The rotating electrical machine 10 is provided with a rotor 12, and a stator 14 concentrically disposed so as to encompass the rotor 12. The rotor 12 includes a rotor core 16 that is generally cylindrical, and a rotor shaft 18 that passes through the center of the rotor core 16. The center line of the rotor shaft 18 is a rotation axis A of the rotor 12. A direction following the rotation axis A will be referred to as "axial direction", a direction orthogonal thereto as "radial direction", and a direction following a circle centered on the rotation axis A as "circumferential direction". The rotor core 16 is provided with rotor core plates 20, obtained by machining magnetic steel plates into a predetermined shape, which are laminated in the direction of the rotation axis A. Permanent magnets 22 are disposed near the outer circumferential face of the rotor core 16. Two permanent magnets 22, arranged in a shape of the letter V opened toward the outside in the radial direction, constitute one magnetic pole in the rotating electrical machine 10. The number of magnetic poles of the rotor 12 is eight, as can be seen from FIG. 1. The stator 14 has a stator core 24 and coils 26 wound on the stator core 24. The stator core 24 includes stator core plates 28 obtained by machining magnetic steel plates into a predetermined shape, which are laminated. The stator core 24 has a generally-annular or generally cylindrical yoke 30, and teeth 32 on the inner circumferential face of the yoke 30, arranged following the circumferential direction with spaces therebetween. The number of teeth 32 in the rotating electrical machine 10 is twelve. The spaces between adjacent teeth 32 will be referred to as "slots 34". The slots 34 are defined by the side faces of adjacent teeth 32 facing each other, and the inner circumferential face of the yoke 30, with the inner side in the radial direction and the ends in the axial direction being open. The side faces of the teeth defining the slots 34 will be referred to as "tooth-side faces 32*a*", and the inner circumferential face of the yoke 30 as "yoke inner circumferential face 30*a*" (see FIG. 3). The yoke inner circumferential face 30*a*, and the tooth-side faces 32*a* facing each other constitute a slot wall face 35 that defines the slot 34 (see FIG. 3).

A coil wire 36 is wound on the teeth 32, thereby providing coils 26. The coil wire 36 is a flat wire where the cross-sectional shape is rectangular, for example, extending in the axial direction in the slots 34. The coil 26 in the rotating electrical machine 10 is what is known as a concentrated winding coil, where the coil wire 36 is continuously wound onto one tooth 32. Insulating sheets 38 are disposed in the slots 34, to electrically insulate between the stator core 24 and the coils 26. The insulating sheets 38 may be made of paper or may be made of resin. The insulating sheets 38 may alternatively be sheets where different types of materials are laminated. FIG. 2 illustrates the coil wire 36 such that the background can be seen through, to clearly illustrate the insulating sheet 38.

The rotor shaft 18 is a hollow shaft, and coolant flows through the hollow space. A lubricating oil that lubricates bearings and the like supporting the rotor 12 can be used for the coolant. In-shaft channels 40 that extend in the radial direction, connecting the hollow space and the outer circumferential face, are provided in the rotor shaft 18, with the in-shaft channels 40 opening to the outer circumferential face of the rotor shaft 18. Coolant is fed to the outer circumferential face of the rotor shaft 18 through the in-shaft channels 40. In-rotor-core channels 42 are provided in the rotor core 16. The ends of the in-rotor-core channels 42 on the inner side in the radial direction face the openings of the in-shaft channels 40 provided at the outer circumferential face of the rotor shaft 18. Also, the ends of the in-rotor-core channel 42 on the outer side in the radial direction open to the outer circumferential face of the rotor core 16. These openings will be referred to as "discharge ports 42*a*". The coolant passes through the in-shaft channels 40 and the in-rotor-core channels 42 to be fed to the outer perimeter of the rotor core 16, and is discharged from the discharge ports 42*a* of the in-rotor-core channel 42.

Figure 3:
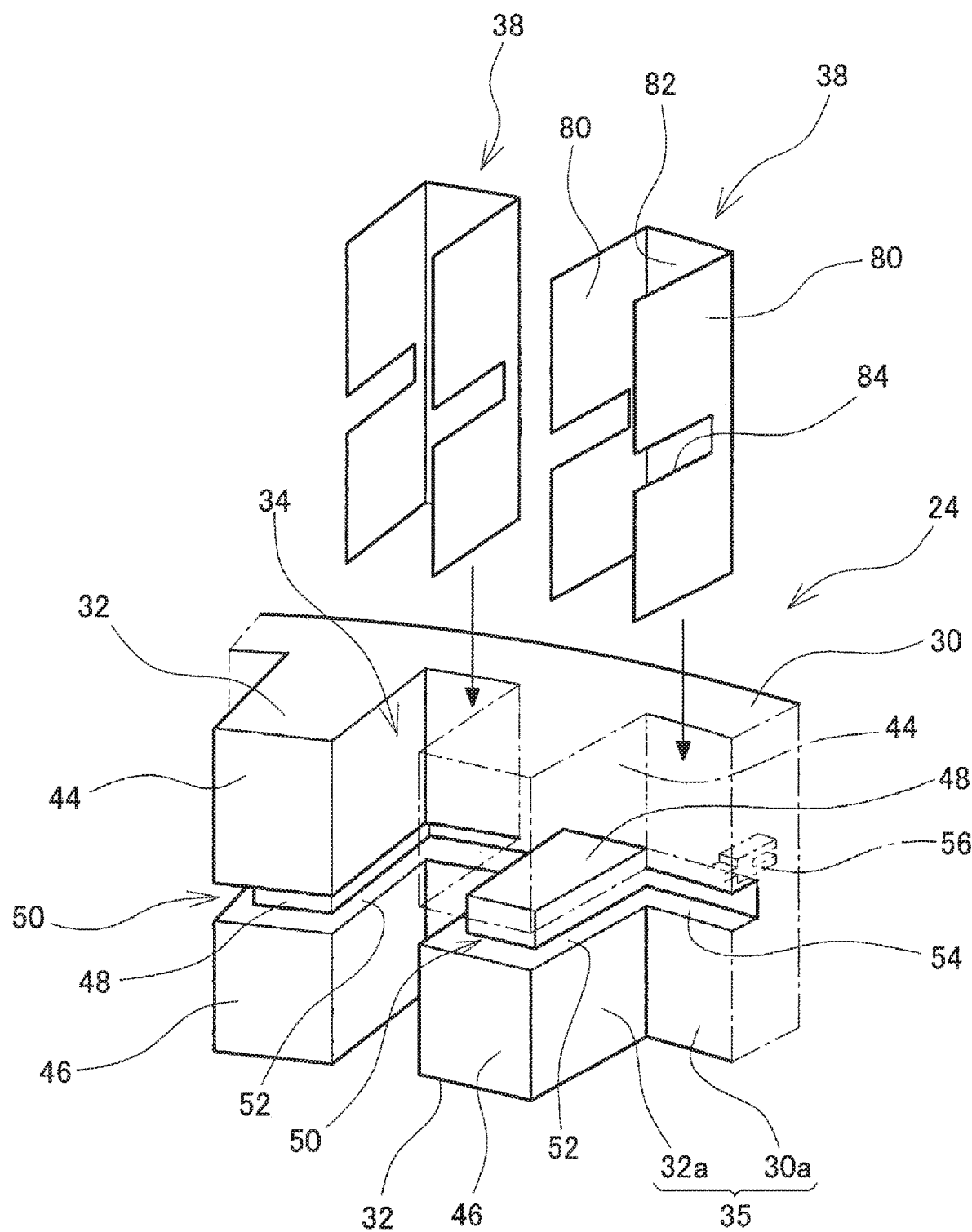
FIG. 3 is a perspective view illustrating a portion including two teeth of the rotating electrical machine illustrated in FIGS. 1 and 2.

FIG. 3 is a perspective view schematically illustrating a portion of the stator core 24, in particular a portion including two teeth 32. A part of the teeth 32 is illustrated such that the background can be seen through, to further clarify the shape of the stator core 24. FIG. 3 illustrates a state where the insulating sheets 38 are removed from the stator core 24. The shape of the teeth 32 will be described with reference to FIGS. 1 to 3. Each tooth 32 includes a first main portion 44 and a second main portion 46 which define the overall shape of the tooth 32, and a small portion 48 that is interposed between the first main portion 44 and the second main portion 46 in the axial direction. The width of the small portion 48 is smaller than that of the first main portion 44 and the second main portion 46, and the length of the small portion 48 in the radial direction of the stator core 24 is smaller than that in the radial direction of the stator core 24 of the first main portion 44 and the second main portion 46. That is to say, the tip end of the small portion 48 does not reach as far as the tip ends of the first main portion 44 and the second main portion 46. Thus, a tooth surface groove 50 is provided following the surface of the tooth 32. The tooth surface groove 50 constitutes a channel on the tooth-side face 32*a* that extends in the radial direction and is open into the slot 34. This channel will be referred to as "side-face channel 52". The small portion 48 is disposed at the same position in the axial direction (up-down direction in FIG. 3) as the discharge ports 42*a* of the in-rotor-core channel 42. Accordingly, the side-face channel 52 receives the coolant discharged from the discharge ports 42*a*, and the coolant further flows through the side-face channel 52 toward the outer side in the radial direction.

A groove extending in the circumferential direction is provided on the yoke inner circumferential face 30*a* defining the bottom of the slots 34. This groove connects to the tooth surface grooves 50, and the side-face channels 52 in particular, and opens into the slots 34. This groove serves as a channel where coolant fed from the side-face channel 52 flows. This channel will be referred to as "bottom-face channel 54". The side-face channels 52 and the bottom-face channel 54 individually or collectively are slot-wall-face channels provided in the slot wall faces 35. The slot-wall-face channels may be disposed in a plane orthogonal to the rotation axis A.

In-yoke channels 56, of which one end opens to the bottom of the bottom-face channel 54 and the other end opens to the outer circumferential face of the yoke 30, are provided in the yoke 30. The coolant flowing through the side-face channels 52 and the bottom-face channel 54 passes through the in-yoke channels 56 and is discharged from the outer circumferential face of the yoke 30.

Figure 4:
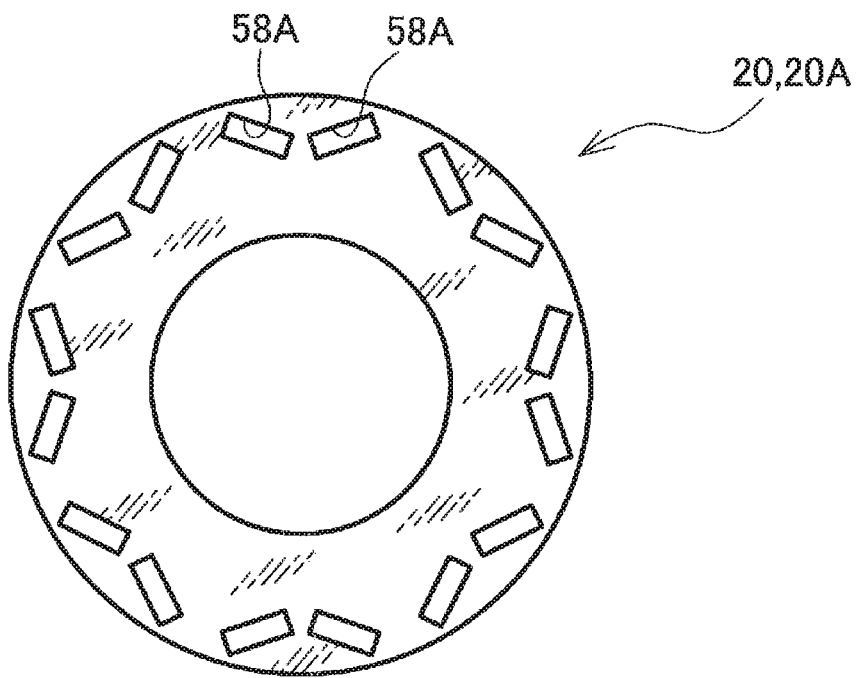
FIG. 4 is a diagram illustrating a core plate consisting a rotor core of the rotating electrical machine, and in particular a core plate of a portion where a channel for coolant is not provided.
Figure 5:
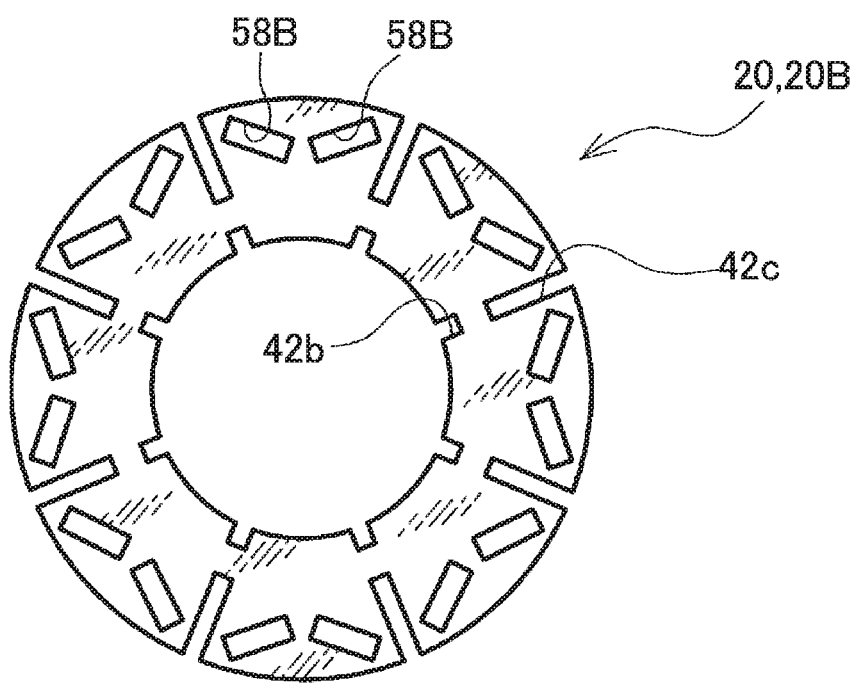
FIG. 5 is a diagram illustrating a core plate consisting the rotor core of the rotating electrical machine, and in particular a core plate for providing channels for coolant in the rotor core.
Figure 6:
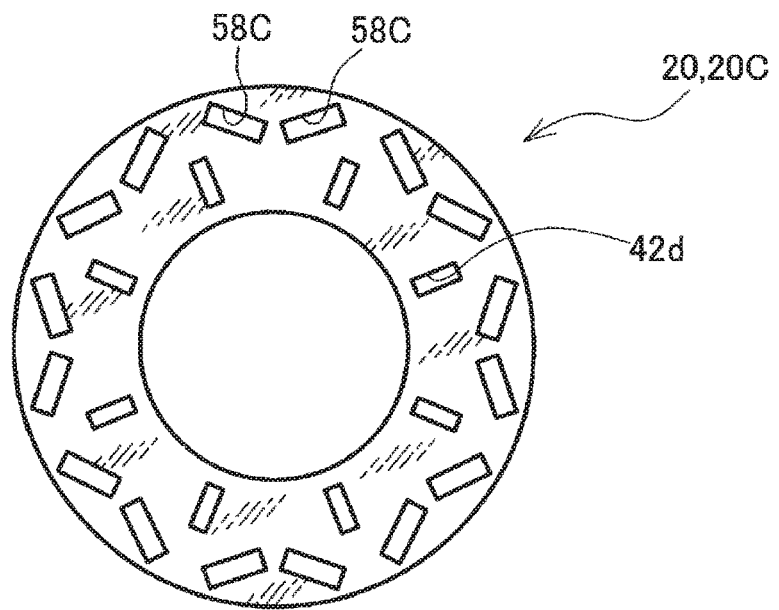
FIG. 6 is a diagram illustrating a core plate consisting the rotor core of the rotating electrical machine, and in particular a core plate for providing channels for coolant in the rotor core.
Figure 7:
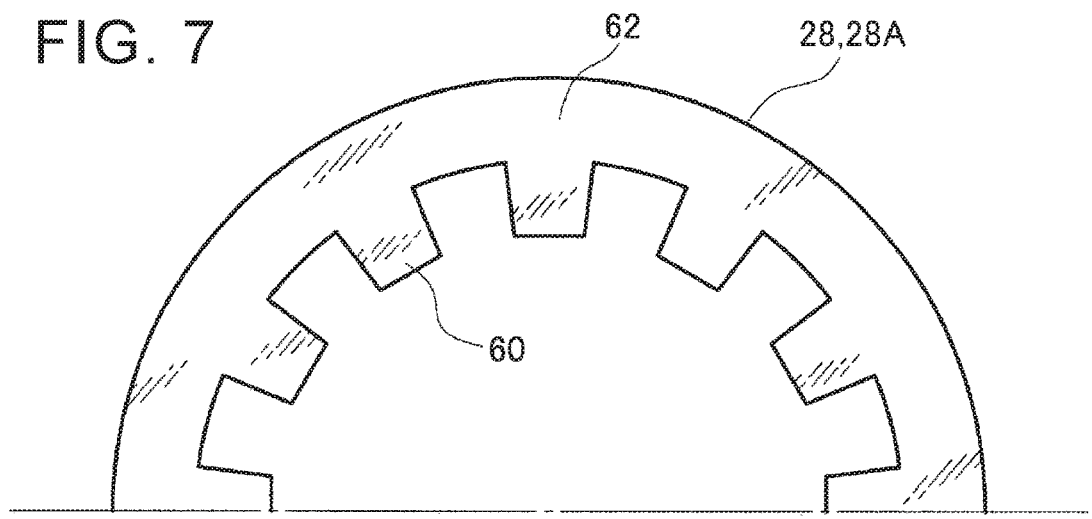
FIG. 7 is a diagram illustrating a core plate consisting a stator core of the rotating electrical machine, and in particular a core plate of a portion where a channel for coolant is not provided.

FIGS. 4 to 6 are diagrams illustrating the shape of the rotor core plate 20. The rotor core plate 20 includes a plurality of types of plates for providing the in-rotor-core channel 42. The type of plate of which the number is the greatest is the plate illustrated in FIG. 4 that does not have slits for providing the in-rotor-core channels 42. This plate will be referred to as "first rotor core plate 20A". There are two types of plates that have slits for providing the in-rotor-core channels 42, one of which will be referred to as "second rotor core plate 20B" (see FIG. 5), and the other as "third rotor core plate 20C" (see FIG. 6).

The first to third rotor core plates 20A, 20B, 20C have annular shapes, and are respectively provided with first magnet-holding holes 58A, second magnet-holding holes 58B, and third magnet-holding holes 58C near the outer perimeter. The first magnet-holding holes 58A, the second magnet-holding holes 58B, and the third magnet-holding holes 58C are aligned in the axial direction, thereby providing integral magnet-holding holes 58 in the rotor core 16 (see FIG. 1). The permanent magnets 22 are held in the magnet-holding holes 58.

Slits that extend in the radial direction are provided in the second rotor core plates 20B. The slits are interrupted partway. The portion on the inner side in the radial direction will be referred to as "rotor inner-side slits 42*b*", and those on the outer side will be referred to as "rotor outer-side slits 42*c*". Eight of each of the rotor inner-side slits 42*b* and the rotor outer-side slits 42*c* are provided, each situated between the magnetic poles. The number of the rotor inner-side slits 42*b* and the rotor outer-side slits 42*c* is not limited to eight, and may be four or two, for example. The rotor inner-side slits 42*b* reach the inner circumferential edge of the second rotor core plate 20B, and open inward in the radial direction. The rotor outer-side slits 42*c* reach the outer circumferential edge of the second rotor core plate 20B, and open outward in the radial direction.

Rotor middle slits 42*d* that extend in the radial direction are provided in the third rotor core plate 20C. Neither the ends of the rotor middle slits 42*d* on the inner side in the radial direction nor the ends on the outer side in the radial direction reach either of the inner circumferential edge or the outer circumferential edge of the third rotor core plate 20C.

The ends of the rotor middle slits 42d on the inner side in the radial direction overlap the outer ends of the rotor inner-side slits 42b of the second rotor core plate 20B, and the ends on the outer side of the rotor middle slits 42d overlap the ends of the rotor outer-side slits 42c on the inner side.

Disposing the second rotor core plates 20B and the third rotor core plates 20C adjacent to each other connects the rotor inner-side slits 42b, the rotor middle slits 42d, and the rotor outer-side slits 42c, thereby providing in-rotor-core channels 42 that connect the inner circumferential face with the outer circumferential face of the rotor core 16. A predetermined number of third rotor core plates 20C are disposed on respective sides of a predetermined number of second rotor core plates 20B in the rotating electrical machine 10. The second and third rotor core plates 20B, 20C are disposed at the middle portion of the rotor core 16 in the axial direction, thus providing the in-rotor-core channel 42 at the middle portion of the rotor core 16.

FIGS. 7 to 10 are diagrams illustrating the shapes of the stator core plates 28. In FIGS. 7 to 10, the upper half of the plates 28 are illustrated, and the lower half is symmetrical with the upper half. The stator core plates 28 include a plurality of types of plates, for providing the side-face channels 52, the bottom-face channel 54, and the in-yoke channels 56. The type of plate of which the number is the greatest is the plate illustrated in FIG. 7, having primary-portion protrusions 60 serving as the first main portions 44 and the second main portions 46 of the teeth 32. This plate will be referred to as "first stator core plate 28A". The first stator core plate 28A has a broad annular portion 62 that is annular in shape, with primary-portion protrusions 60 being arranged following the inner circumferential edge of the broad annular portion 62 with spaces therebetween. The first main portions 44 and the second main portions 46 of the teeth are provided by the primary-portion protrusions 60 being laminated.

Figure 8:
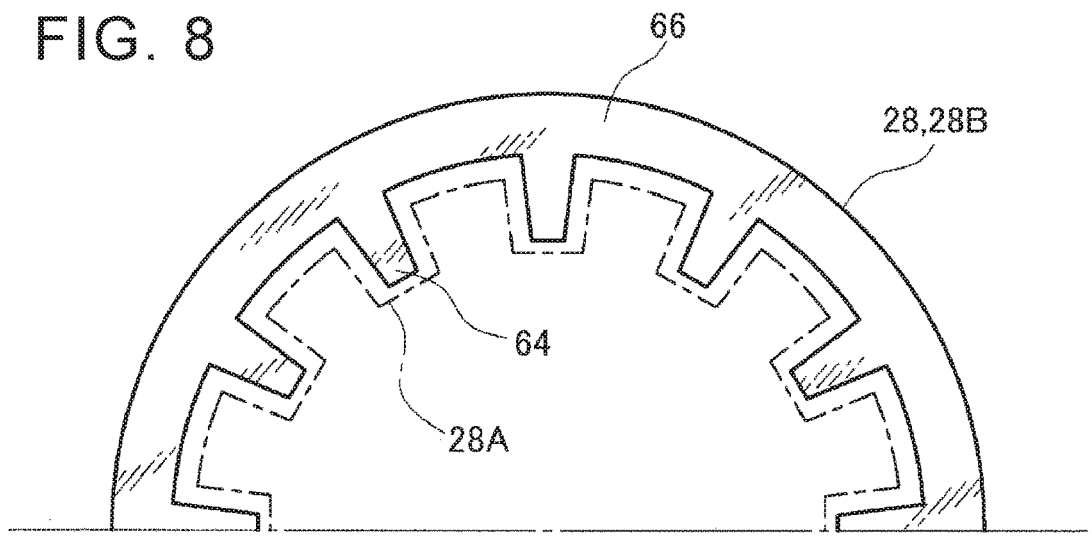
FIG. 8 is a diagram illustrating a core plate consisting the stator core of the rotating electrical machine, and in particular a core plate for providing channels for coolant in the stator core.

The plate illustrated in FIG. 8 has small-portion protrusions 64 that provide the small portions 48 of the teeth 32. This plate will be referred to as "second stator core plate 28B". The outer diameter of the second stator core plate 28B is equal to that of the first stator core plate 28A. FIG. 8 illustrates the outline of the first stator core plate 28A in a state overlaid on the second stator core plate 28B by a long dashed short dashed line. The second stator core plate 28B has a narrow annular portion 66 of which the dimension in the radial direction is shorter than that of the broad annular portion 62 of the first stator core plate 28A. The small-portion protrusions 64 are arranged following the inner circumferential edge of the narrow annular portion 66 with spaces therebetween, at the same pitch as that of the primary-portion protrusions 60. The small-portion protrusions 64 are smaller in width (dimension in circumferential direction) than the primary-portion protrusions 60, and the end on the inner side in the radial direction does not reach as far as the end of the primary-portion protrusions 60. That is to say, the small-portion protrusions 64 are one size smaller than the primary-portion protrusions 60 overall.

Figure 9:
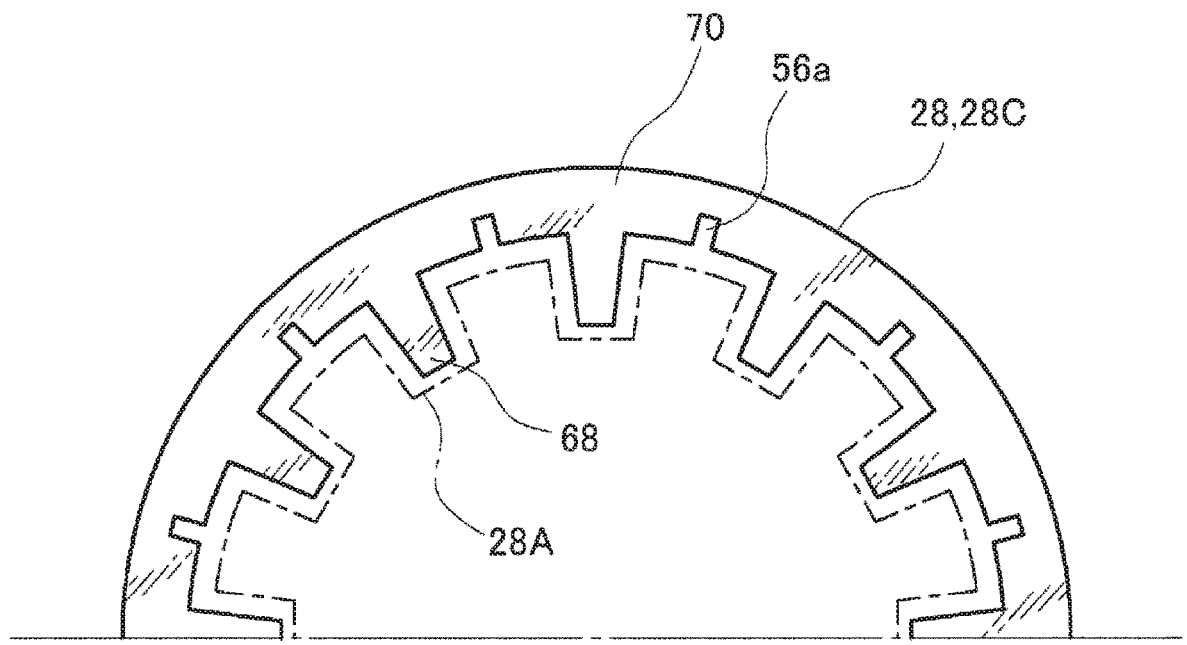
FIG. 9 is a diagram illustrating a core plate consisting the stator core of the rotating electrical machine, and in particular a core plate for providing channels for coolant in the stator core.

The plate illustrated in FIG. 9 has small-portion protrusions 68 that constitute the small portions 48 of the teeth 32, with slits 56a extending in the radial direction further provided therein. This plate will be referred to as "third stator core plate 28C". The outer diameter of the third stator core plate 28C is equal to that of the first and second stator core plates 28A, 28B. FIG. 9 illustrates the outline of the first stator core plate 28A in a state overlaid on the third stator core plate 28C by a long dashed short dashed line. The third stator core plate 28C has a narrow annular portion 70 of which the dimension in the radial direction is the same as that of the narrow annular portion 66 of the second stator core plate 28B. The small-portion protrusions 68 are the same shape as the small-portion protrusions 64 of the second stator core plate 28B, and are arranged following the inner circumferential edge of the narrow annular portion 70 with spaces therebetween, at the same pitch as that of the primary-portion protrusions 60. The slits 56a are provided on the inner side in the radial direction, reach the inner circumferential edge of the narrow annular portion 70, and open toward the inner side in the radial direction. These slits 56a will be referred to as "yoke inner-side slits 56a".

Figure 10:
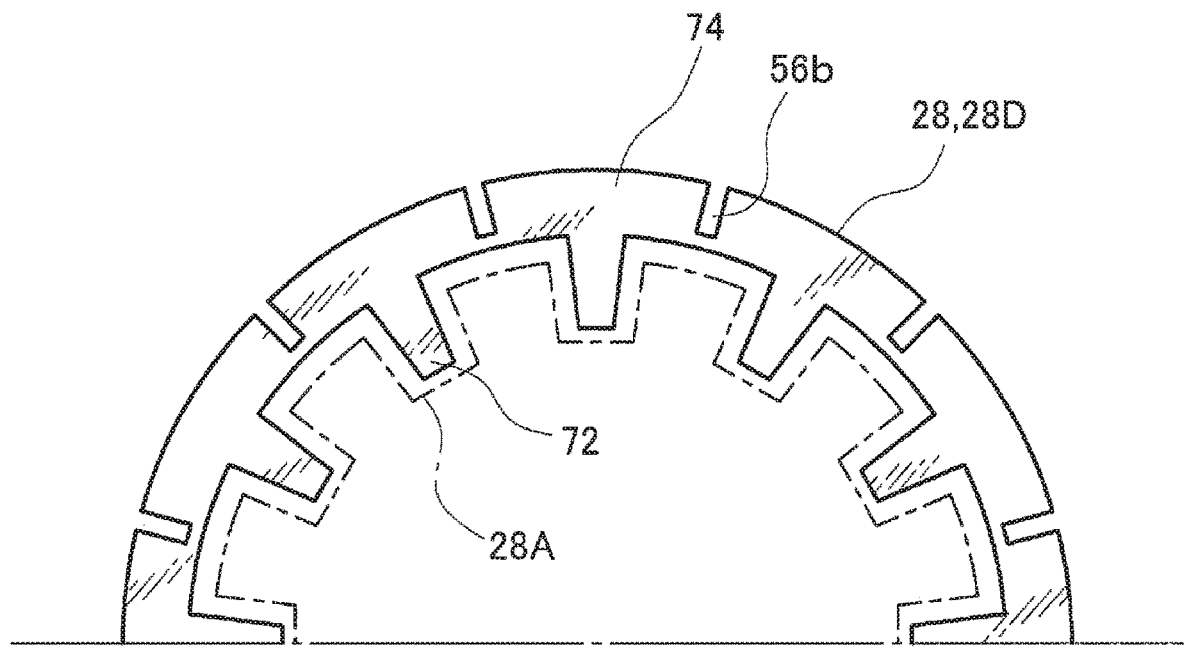
FIG. 10 is a diagram illustrating a core plate consisting the stator core of the rotating electrical machine, and in particular a core plate for providing channels for coolant in the stator core.

The plate illustrated in FIG. 10 has small-portion protrusion 72 that constitute the small portions 48 of the teeth 32, with slits 56b extending in the radial direction further provided therein. This plate will be referred to as "fourth stator core plate 28D". The outer diameter of the fourth stator core plate 28D is equal to that of the first to third stator core plates 28A, 28B, 28C. FIG. 10 illustrates the outline of the first stator core plate 28A in a state overlaid on the fourth stator core plate 28D by a long dashed short dashed line. The fourth stator core plate 28D has a narrow annular portion 74 of which the dimension in the radial direction is the same as that of the narrow annular portions 66, 70 of the second and third stator core plates 28B, 28C. The small-portion protrusions 72 are the same shape as the small-portion protrusions 64, 68 of the second and third stator core plates 28B, 28C, and are arranged following the inner circumferential edge of the narrow annular portion 74 with spaces therebetween, at the same pitch as that of the primary-portion protrusions 60. The slits 56b are provided on the outer side in the radial direction, reach the outer circumferential edge of the narrow annular portion 74, and open toward the outer side in the radial direction. These slits 56b will be referred to as "yoke outer-side slits 56b".

The first to fourth stator core plates 28A, 28B, 28C, and 28D are disposed as follows. A predetermined number of the third stator core plates 28C are disposed at the middle in the axial direction, a predetermined number of the fourth stator core plates 28D are disposed adjacent thereto on both sides thereof, with a predetermined number of the second stator core plates 28B being disposed on the outer side thereof, and a predetermined number of the first stator core plate 28A being disposed further on the outer side thereof.

Laminating the second to fourth stator core plates 28B, 28C, 28D, and interposing the stator core plates above with laminated first stator core plates 28A, provides the side-face channels 52, the bottom-face channel 54, and the in-yoke channels 56. The small-portion protrusions 64, 68, 72 of the second to fourth stator core plates 28B, 28C, 28D provide the tooth surface grooves 50 that are recessed as compared to the surroundings, and the side-face channels 52. The annular portions of the second to fourth stator core plates 28B, 28C, 28D provide the bottom-face channel 54 that is recessed as compared to the surroundings. Further, placing the third stator core plate 28C and the fourth stator core plate 28D adjacently causes the end of the yoke inner-side slits 56a to the outer side in the radial direction and the end of the yoke outer-side slits 56b to the inner side in the radial direction to overlap, thereby providing the in-yoke channels 56 that connect the inner circumferential face and the outer circumferential face of the yoke 30. Note that the second stator core plate 28B may be omitted, and the first stator core plate 28A may be placed adjacent to the fourth stator core plate 28D.

Returning to FIGS. 1 to 3, the insulating sheets 38 will be described. The insulating sheets 38 have an open-box shape or a squarish letter-U shape in a cross-section orthogonal to the rotation axis A when disposed in the slots 34, and extend over the entire length of the slots 34 in the axial direction. The length of the insulating sheets 38 is equal to the length of the slots 34 in the axial direction, or slightly longer. The insulating sheets 38 each have insulating-sheet side faces 80 that face the tooth-side faces 32a, and an insulating-sheet bottom face 82 that faces the yoke inner circumferential face 30a. The insulating-sheet side faces 80 are interposed between the tooth-side faces 32a and the coil wires 36 in the slots 34, insulating therebetween. The insulating-sheet bottom face 82 is interposed between the yoke inner circumferential face 30a and the coil wires 36 in the slots 34, insulating therebetween. The insulating-sheet side faces 80 correspond to the sides of the open-box shape that intersect the open side, and the insulating-sheet bottom face 82 corresponds to the side of the open-box shape on the far side from the open side.

Notches 84 are provided in the insulating-sheet side faces 80 along the radial direction from the inner side in the radial direction. The notches 84 correspond to at least one portion of the side-face channel 52. The notches 84 of the insulating sheet 38 do not reach the insulating-sheet bottom face 82, and the insulating-sheet side faces 80 are not completely divided by the notches 84 but are connected as one. The notches 84 may be provided to reach the bottom face. The insulating-sheet bottom face 82 extends over the entirety of the slots 34 in the axial direction, with no notches or openings being provided at positions corresponding to the bottom-face channel 54.

Extending the insulating sheets 38 over the entire length of the slots 34 enables the positions of the insulating sheets 38 within the slots 34 to be stabilized. For example, when inserting the coil wire 36 into the slots 34 in the axial direction, the coil wire 36 acts to push out the insulating sheets 38 already disposed in the slots 34 toward the far side in the direction of insertion. Movement of the insulating sheets 38 can be suppressed at this time by placing a jig at the end face of the stator core 24 at the far side such that one end of the insulating sheets 38 comes into contact therewith.

The coolant flowing through the side-face channel 52 comes into direct contact with the coil wire 36 through the notches 84 of the insulating sheets 38, and cools the coil wire 36. The coolant passes from the side-face channels 52 through the bottom-face channel 54 and further through the in-yoke channels 56, and is discharged from the outer circumferential face of the stator core 24. Discharging the coolant from the outer circumferential face of the stator core 24 enables new coolant to be constantly supplied to the side-face channels 52. That is to say, the in-yoke channels 56 are provided here to improve the flow of coolant and improve the performance of cooling the coils 26. Also, part of the coolant flowing through the side-face channels 52 flows into the slots 34 through the notches 84, passes through gaps of the coil wire 36, and flows out from the ends of the slots 34.

Figure 11:
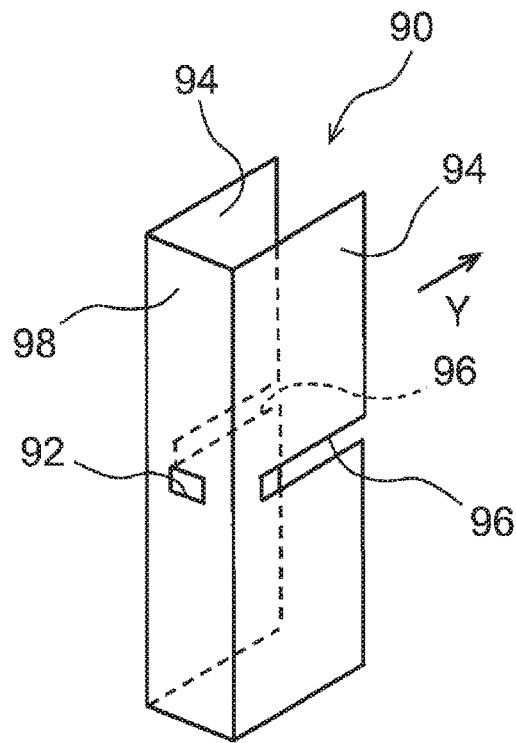
FIG. 11 is a diagram illustrating a first modification of the insulating sheet, illustrating an insulating sheet that has an open-box-shaped cross-sectional shape, with notches provided in the sides and an opening provided in the bottom.

FIG. 11 is a diagram illustrating another form of the insulating sheets. An insulating sheet 90 illustrated in FIG. 11 is the above-described insulating sheet 38, with an opening 92 provided to the insulating-sheet bottom face 82. The direction of the arrow Y in FIG. 11 indicates the inner side in the radial direction of the rotating electrical machine 10 (i.e., the inner side in the radial direction is the opposite as to FIG. 3). Notches 96 facing at least part of the side-face channels 52 are provided in insulating-sheet side faces 94 of the insulating sheet 90. Also, a bottom-face opening 92 is provided in an insulating-sheet bottom face 98, facing at least part of the bottom-face channel 54. Coolant flowing through the bottom-face channel 54 comes into direct contact with the coil wire 36 in the slot 34 through this bottom-face opening 92, and cools the coil wire 36. Also, part of the coolant flows into the slot 34 through the bottom-face opening 92 and cools the coil wire 36. When the amount of coolant flowing into the slot 34 from portions other than the bottom-face opening 92 is great, coolant within the slot 34 is discharged from the bottom-face opening 92.

Figure 12:
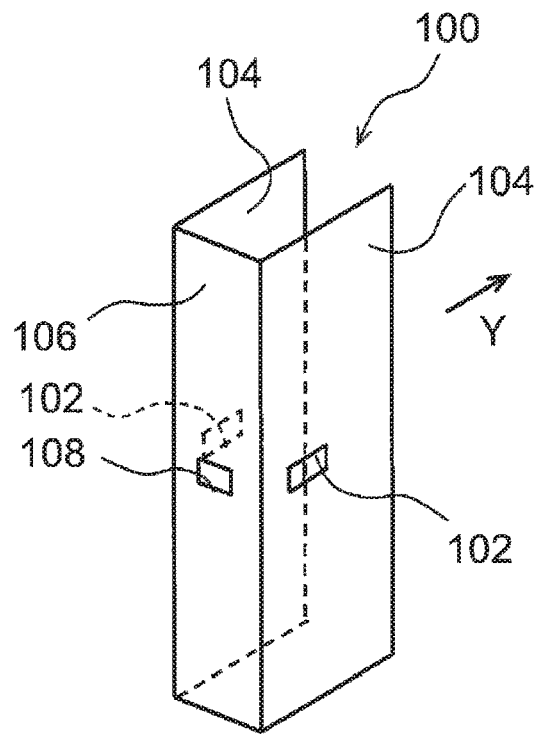
FIG. 12 is a diagram illustrating a second modification of the insulating sheet, illustrating an insulating sheet that has an open-box-shaped cross-sectional shape, with openings provided in the sides and bottom.

FIG. 12 is a diagram illustrating yet another form of the insulating sheets. An insulating sheet 100 illustrated in FIG. 12 is the above-described insulating sheet 90, with the notch 96 replaced by an opening 102. The direction of the arrow Y in FIG. 12 indicates the inner side in the radial direction of the rotating electrical machine 10. Side-face openings 102 facing part of the side-face channels 52 are provided in insulating-sheet side faces 104 of the insulating sheet 100. Coolant flowing through the side-face channels 52 comes into direct contact with the coil wire 36 in the slot 34 through the side-face openings 102, and cools the coil wire 36. Also, part of the coolant flows into the slot 34 through the side-face openings 102 and cools the coil wire 36. Also, a bottom-face opening 108 is provided in an insulating-sheet bottom face 106, facing at least part of the bottom-face channel 54. Coolant flowing in the bottom-face channel 54 comes into direct contact with the coil wire 36 in the slot 34 through the bottom-face opening 108, and cools the coil wire 36. Also, part of the coolant flows into the slot 34 through the bottom-face opening 108 and cools the coil wire 36.

An arrangement may be made where no notches or openings are provided to the side faces of the insulating sheets, with an opening provided only in the insulating-sheet bottom face.

Figure 13:
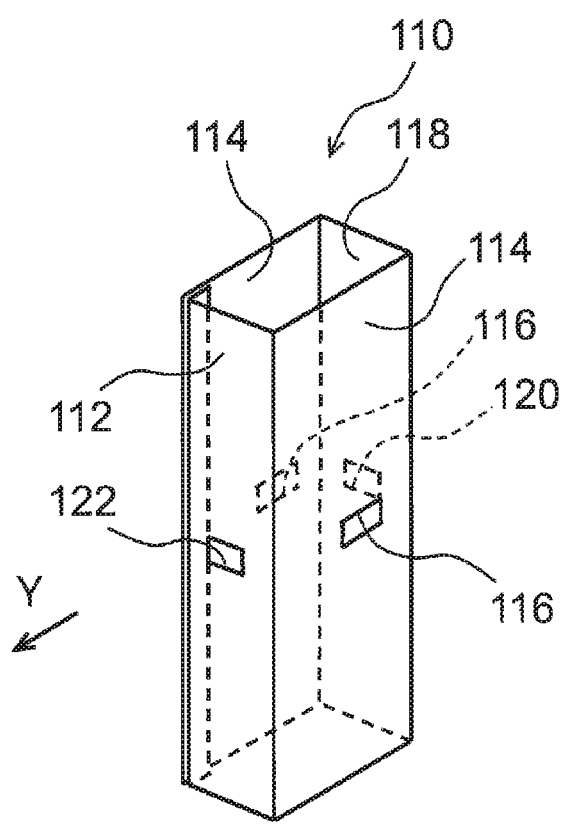
FIG. 13 is a diagram illustrating a third modification of the insulating sheet, illustrating an example of an insulating sheet that has a box-shaped cross-sectional shape.

FIG. 13 is a diagram illustrating yet another form of the insulating sheets. Unlike the above-described insulating sheets 38, 90, 100, an insulating sheet 110 illustrated in FIG. 13 has a frame shape of which the cross-sectional shape in the direction orthogonal to the rotation axis A of the rotating electrical machine 10 is box-shaped or square. The direction of the arrow Y in FIG. 13 indicates the inner side in the radial direction of the rotating electrical machine 10 (i.e., the inner side in the radial direction is the opposite direction as compared to FIG. 12). The insulating sheet 110 has a cover portion 112 added to the open portion of the open-box-shaped insulating sheet 100 illustrated in FIG. 12. Side-face openings 116 facing part of the side-face channels 52 are provided in insulating-sheet side faces 114 of the insulating sheet 110. Coolant flowing through the side-face channels 52 comes into direct contact with the coil wire 36 in the slot 34 through these side-face openings 116, and cools the coil wire 36. Also, part of the coolant flows into the slot 34 through the side-face openings 116 and cools the coil wire 36. A bottom-face opening 120 is provided in an insulating-sheet bottom face 118, facing at least part of the bottom-face channel 54. Coolant flowing through the bottom-face channel 54 via the bottom-face opening 120 comes into direct contact with the coil wire 36 in the slot 34, and cools the coil wire 36. Also, part of the coolant flows into the slot 34 through the bottom-face opening 120 and cools the coil wire 36. When the insulating sheet 110 is disposed in a slot, the cover portion 112 is situated at the portion of the slots 34 that opens toward the rotor 12, and covers the coil wire 36 in the slot 34. A cover-portion opening 122 is provided in at least part of the portion of the cover portion 112 that faces the discharge port 42a of the in-rotor-core channel 42. That is to say, the cover-portion opening 122 is at the same position as the discharge port 42a in the axial direction, and accepts coolant discharged from the discharge port 42a when rotation of the rotor 12 brings the discharge port 42a to a position facing the cover-portion opening 122. Accordingly, coolant is supplied into the slot 34, and the coil wire 36 is cooled. In particular, coolant is supplied from the cover-portion opening 122 to the coil wire 36 disposed in a portion of the slot 34 close to the rotor 12.

Figure 14:
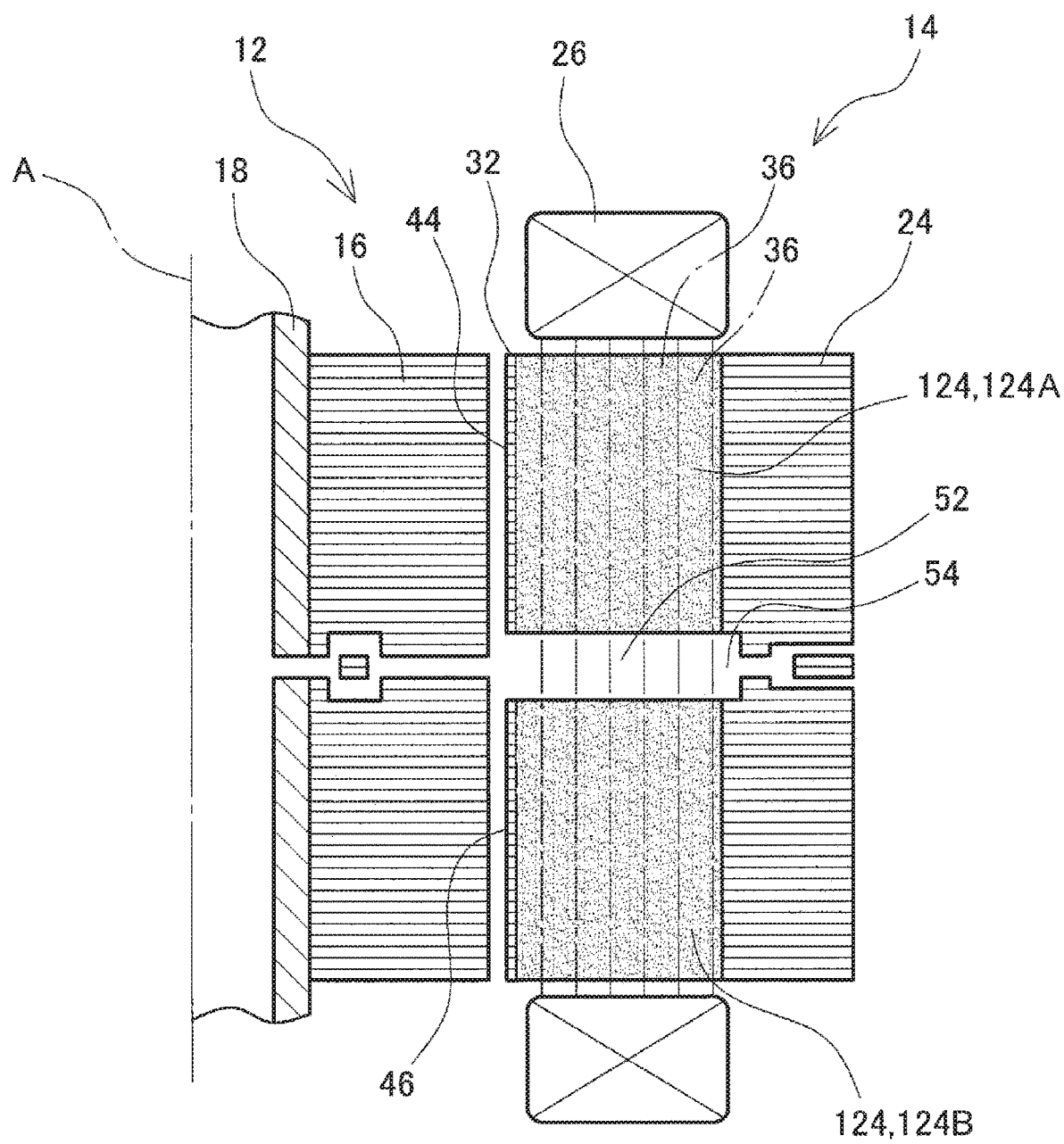
FIG. 14 is a diagram schematically illustrating a cross-section including a rotation axis of a rotating electrical machine according to another embodiment of the disclosure.
Figure 15:
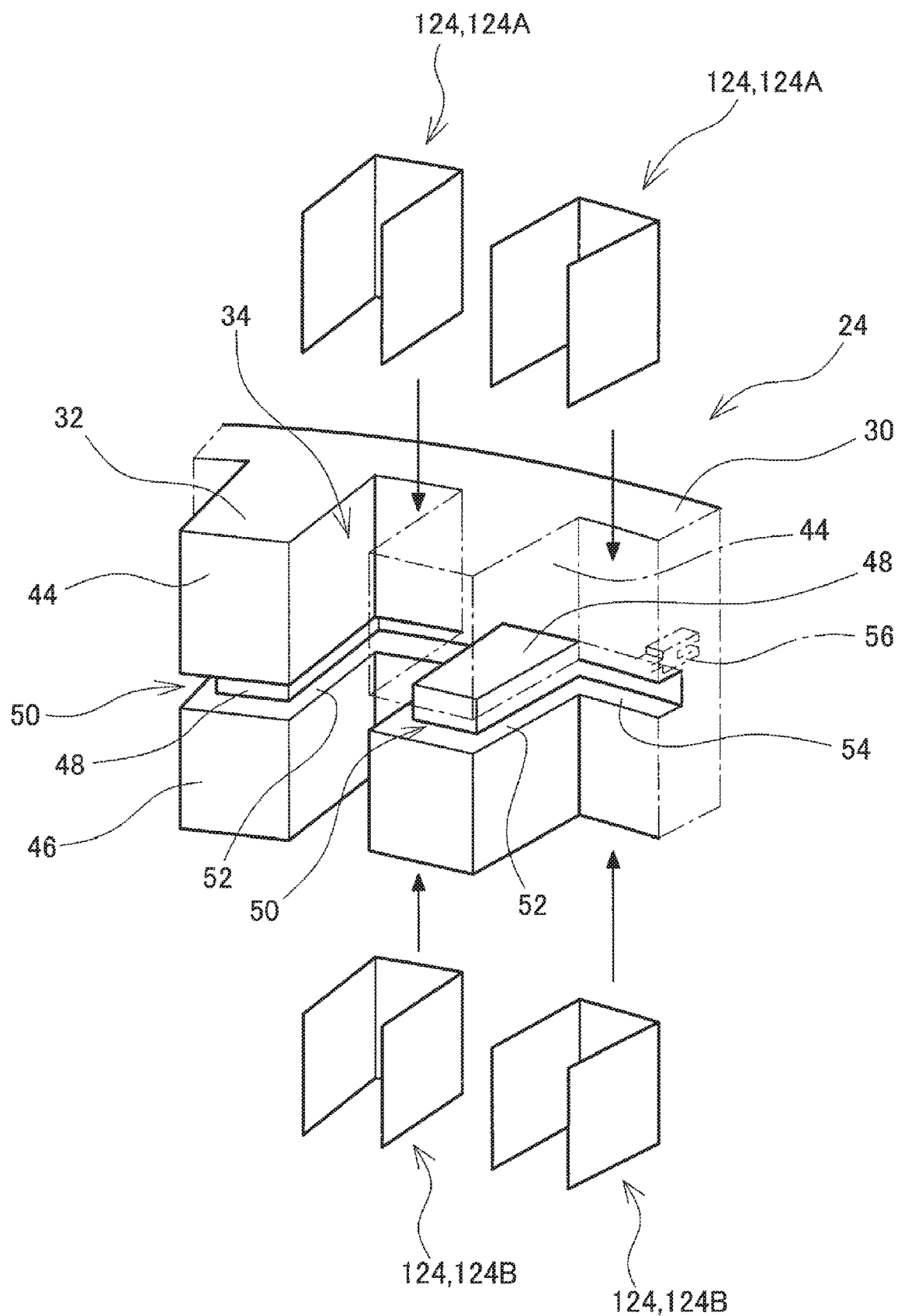
FIG. 15 is a perspective view illustrating a portion including two teeth of the rotating electrical machine illustrated in FIG. 14.

FIGS. 14 and 15 are diagrams illustrating yet another form of the insulating sheets. Configurations other than those of the insulating sheets in FIGS. 14 and 15 are the same as those illustrated in FIGS. 2 and 3, denoted by the same signs, and description thereof will be omitted. An insulating sheet 124 illustrated in FIGS. 14 and 15 is divided into two in the axial direction, at the position of the side-face channels 52 and the bottom-face channel 54, i.e., at the position of the slot-wall-face channels. A first insulating sheet segment 124A, which is one of the two into which the insulating sheet 124 is divided, is disposed corresponding to one first main portion 44 of the teeth 32, and a second insulating sheet segment 124B that is the other, is disposed corresponding to the other second main portion 46. The first insulating sheet segment 124A and the second insulating sheet segment 124B each have an open-box shape in a cross-section orthogonal to the rotation axis A. A gap is provided between the first insulating sheet segment 124A and the second insulating sheet segment 124B, this gap corresponding to the side-face channels 52 and the bottom-face channel 54. Coolant flowing through the side-face channels 52 and the bottom-face channel 54 via this gap comes into direct contact with the coil in the slot 34 and cools the coil wire 36. Also, part of the coolant flows into the slot 34 through the gap and cools the coil wire 36. The cross-sectional shape of the first insulating sheet segment 124A and the second insulating sheet segment 124B may be a box shape rather than an open-box shape.

The discharge ports 42a provided to the outer circumferential face of the rotor core 16 and the side-face channels 52, the bottom-face channel 54, and the in-yoke channels 56 provided to the stator core 24 may be provided at positions other than the middle in the axial direction, and may be provided at a plurality of positions. In this arrangement, the notches and openings provided to the insulating sheets 38, 90, 100, 110 may each be provided corresponding to the plurality of discharge ports 42a and the channels 52, 54, 56. When dividing the insulating sheets in the axial direction, the division may be made at the positions of the discharge ports and the channels. Also, of the channels provided to the stator core 24, the in-yoke channels 56 may be omitted, or the bottom-face channel 54 and the in-yoke channels 56 may be omitted. Also, an arrangement may be made where a side-face channel 52 is provided on only one tooth-side face 32a of the two tooth-side faces 32a defining a slot 34. Also, the tip end of the small portion 48 of the tooth 32 may match the tip ends of the first main portion 44 and the second main portion 46 of the tooth 32 such that that the groove on the bottom of the tooth-side faces 32a is provided over the entire height of the tooth 32.

The rotating electrical machine 10 is provided with the concentrated winding coils 26, but the above-described coolant channels and insulating sheets are applicable to rotating electrical machines that are provided with distributed winding coils as well.

Another form of the rotating electrical machine according to the disclosure is described below. A rotating electrical machine includes a rotor, a stator core, coils, and insulating sheets. A discharge port that discharges coolant is provided on an outer circumferential face of the rotor. The stator core includes an annular or cylindrical yoke, and teeth disposed on an inner circumferential face of the yoke in a circumferential direction with spaces. The stator core is disposed encompassing an outer circumference of the rotor. A side-face channel where the coolant flows is provided on a side face of at least one of the teeth defining each slot and extends in the radial direction and open to the slot, at a position corresponding to the discharge port. The coils are wound on the teeth. The insulating sheet is disposed in the slot over the entire length of the slot in the axial direction and interposed between the stator core and the coil. The insulating sheet is provided with an opening or a notch in at least part of a portion facing the side-face channel.

What is claimed is:

1. A rotating electrical machine, comprising:
   a rotor including a rotor core and a rotor shaft, the rotor core comprising a plurality of annular shaped rotor core plates including
      a first rotor core plate being free of slits,
      a second rotor core plate including a rotor inner-side slit extending in a radial direction from an inner circumferential edge of the second rotor plate so as to open inward in the radial direction and a rotor outer-side slit extending in the radial direction from an outer circumferential edge of the second rotor plate so as to open outward in the radial direction, and
      a third rotor core plate including a rotor middle slit extending in the radial direction with a first end of the rotor middle slit overlapping an outer end of the rotor inner-side slit and a second end of the rotor middle slit overlapping an inner end of the rotor outer-side slit, the first and second ends of the rotor middle slit free of reaching an inner circumferential edge or an outer circumferential edge of the third rotor core plate,
   the rotor inner-side slit, the rotor outer-side slit, and the rotor middle slit providing an in-rotor-core channel that connects an inner circumferential face of the rotor core and an outer circumferential face of the rotor core, the in-rotor-core channel including a discharge port that discharges coolant from the outer circumferential face of the rotor core, the coolant being provided to the in-rotor-core channel from an in-shaft channel disposed in the rotor shaft;
   a stator core including an annular or cylindrical yoke, and teeth arranged on an inner circumferential face of the yoke in a circumferential direction with spaces, the stator core being disposed encompassing an outer circumference of the rotor, with a slot-wall-face channel being provided on a wall face of the stator core defining a slot disposed between the teeth that are adjacent in the circumferential direction, the slot-wall-face channel being configured to open as to the slot for the coolant to flow through;
   coils wound on the teeth; and
   an insulating sheet disposed in the slot and interposed between the stator core and the coil, the insulating sheet being configured with at least part of the slot-wall-face channel open as to the coil.

2. The rotating electrical machine according to claim 1, wherein:
   each of the teeth includes a first main portion, a second main portion and a small portion; and
   the small portion is interposed between the first main portion and the second main portion in an axial direction, a width of the small portion being smaller than widths of the first main portion and the second main portion, and a length of the small portion in the radial direction being shorter than lengths of the first main portion and the second main portion in the radial direction.

3. The rotating electrical machine according to claim 2, wherein the stator core comprises a plurality of stator core plates including
a first stator core plate including a first annular portion and primary-portion protrusions arranged following an inner circumferential edge of the first annular portion with spaces therebetween, the first main portion and the second main portion being provided by the primary-portion protrusions,
a second stator core plate with a second annular portion with a shorter than the first annular portion in the radial direction, and small-portion protrusions arranged following an inner circumferential edge of the second annular portion with spaces therebetween at a same pitch as the primary-portion protrusions, a width of the small-portion protrusions in the circumferential direction being smaller than that of the primary-portion protrusions, and an end on an inner side of the small-portion protrusions extending less radially inward than an end of an inner side of the primary-portion protrusions,
a third stator core plate having dimensions same as the second stator core plate and including yoke inner-side slits provided on an inner side in the radial direction and opening toward the inner side in the radial direction, and
a fourth stator core plate having dimensions same as the second stator core plate and including yoke outer-side slits provided on an outer side in the radial direction and opening toward the outer side in the radial direction, an outer end of the yoke inner-side slits overlapping an inner end of the yoke outer-side slits.

4. The rotating electrical machine according to claim 1, wherein the insulating sheet is disposed over an entire length in an axial direction of the slot in which the insulating sheet is disposed.

5. The rotating electrical machine according to claim 4, wherein:
the slot-wall-face channel includes a side-face channel that is provided on a side face of at least one of the teeth defining the slot and extends in the radial direction; and
a notch or an opening is provided to at least a part of the insulating sheet at a portion facing the side-face channel.

6. The rotating electrical machine according to claim 4, wherein:
the slot-wall-face channel includes a side-face channel and a bottom-face channel;
the side-face channel is provided on a side face of at least one of the teeth defining the slot and extends in the radial direction;
the bottom-face channel is provided on the inner circumferential face of the yoke defining the slot and connects to the side-face channel; and
an opening is provided to at least a part of the insulating sheet at a portion facing the bottom-face channel.

7. The rotating electrical machine according to claim 1, wherein the insulating sheet includes a cover portion disposed at a portion where the slot is open as to the rotor so as to cover the coil in the slot, and a notch or an opening is provided to a part of the cover portion.

8. The rotating electrical machine according to claim 1, wherein the discharge port and the slot-wall-face channel are disposed at a same position in an axial direction.

9. The rotating electrical machine according to claim 1, wherein the insulating sheet is divided with a gap at a position of the slot-wall-face channel.

10. The rotating electrical machine according to claim 1, wherein the first rotor core plate includes first magnet-holding holes, the second rotor core plate includes second magnet-holding holes, and the third rotor core plate includes third magnet-holding holes, the first, second, and third magnet-holding holes being aligned in the axial direction.

* * * * *